(12) United States Patent
Kelley et al.

(10) Patent No.: US 8,716,606 B2
(45) Date of Patent: May 6, 2014

(54) SERVICEABLE CONFORMAL EM SHIELD

(75) Inventors: Matthew Kelley, Orlando, FL (US);
Christian Adams, Yalaha, FL (US);
Patrick A. Nelson, Orlando, FL (US)

(73) Assignee: Lockheed Martin Corporation, Bethesda, MD (US)

(*) Notice: Subject to any disclaimer, the term of this patent is extended or adjusted under 35 U.S.C. 154(b) by 504 days.

(21) Appl. No.: 12/904,854

(22) Filed: Oct. 14, 2010

(65) Prior Publication Data

US 2011/0120764 A1    May 26, 2011

Related U.S. Application Data

(60) Provisional application No. 61/251,565, filed on Oct. 14, 2009, provisional application No. 61/348,156, filed on May 25, 2010.

(51) Int. Cl.
*H05K 9/00* (2006.01)

(52) U.S. Cl.
USPC ............................. 174/382; 174/386; 361/818

(58) Field of Classification Search
USPC ............ 257/659; 174/382, 384, 386; 361/818
See application file for complete search history.

(56) References Cited

U.S. PATENT DOCUMENTS

| | | | |
|---|---|---|---|
| 3,931,454 A | 1/1976 | Sprengling | |
| 5,268,566 A | 12/1993 | Wakaumi et al. | |
| 5,512,738 A | 4/1996 | Yuen | |
| 5,538,756 A | 7/1996 | Korleski et al. | |
| 5,597,979 A | 1/1997 | Courtney et al. | |
| 5,635,293 A | 6/1997 | Korleski et al. | |
| 5,759,625 A | 6/1998 | Laubacher et al. | |
| 5,847,650 A | 12/1998 | Zhou et al. | |
| 6,190,941 B1 | 2/2001 | Heinz et al. | |
| 6,203,912 B1 | 3/2001 | Watakabe et al. | |
| 6,233,339 B1 | 5/2001 | Kawano et al. | |
| 6,254,972 B1 | 7/2001 | Farquhar et al. | |
| 6,280,797 B1 | 8/2001 | Kuczynski et al. | |
| 6,421,013 B1 | 7/2002 | Chung | |
| 6,638,690 B1 | 10/2003 | Meier et al. | |
| 6,861,092 B2 | 3/2005 | McCarthy et al. | |
| 6,873,031 B2 * | 3/2005 | McFadden et al. | 257/659 |
| 6,970,360 B2 | 11/2005 | Sinha | |
| 7,037,580 B2 | 5/2006 | Razavi et al. | |
| 7,054,162 B2 | 5/2006 | Benson et al. | |
| 7,173,323 B2 | 2/2007 | Wolters et al. | |
| 7,175,876 B2 | 2/2007 | Free et al. | |
| 7,214,889 B2 | 5/2007 | Mazurkiewicz | |
| 7,274,289 B2 | 9/2007 | Kerr et al. | |

(Continued)

FOREIGN PATENT DOCUMENTS

| | | |
|---|---|---|
| CA | 2011205 | 8/1991 |
| EP | 0 079 589 A1 | 5/1983 |

(Continued)

*Primary Examiner* — Hung Ngo
(74) *Attorney, Agent, or Firm* — Birch, Stewart, Kolasch & Birch, LLP

(57) ABSTRACT

A conformal electro-magnetic (EM) shield and a method of applying such a shield are provided herein as well as variations thereof. Variations include, but are not limited to, frequency-selective shielding, shields containing active and/or passive electronic components, and strippable shields that can easily be applied to and removed from underlying components. Variations of a shield structure include at least an insulating layer between the underling component and the shield, and shielding and/or capping layers disposed over the insulating layer.

17 Claims, 8 Drawing Sheets

(56) References Cited

U.S. PATENT DOCUMENTS

| | | |
|---|---|---|
| 7,383,999 B2 | 6/2008 | Bi et al. |
| 7,429,915 B2 | 9/2008 | Cruzado et al. |
| 7,513,437 B2 | 4/2009 | Douglas |
| 7,585,926 B2 | 9/2009 | Sato et al. |
| 2001/0050175 A1 | 12/2001 | Pulver |
| 2002/0171157 A1 | 11/2002 | Soga et al. |
| 2004/0155308 A1 | 8/2004 | McFadden et al. |
| 2004/0222014 A1 | 11/2004 | Heffner |
| 2005/0039935 A1* | 2/2005 | Kolb et al. .............. 174/350 |
| 2006/0012969 A1 | 1/2006 | Bachman |
| 2007/0100043 A1 | 5/2007 | Shiono |
| 2008/0108767 A1 | 5/2008 | Sato et al. |
| 2008/0272885 A1* | 11/2008 | Atherton .............. 340/10.1 |
| 2009/0047797 A1 | 2/2009 | Anderson et al. |
| 2009/0243065 A1 | 10/2009 | Sugino et al. |

FOREIGN PATENT DOCUMENTS

| | | |
|---|---|---|
| EP | 0 159 942 A2 | 10/1985 |
| EP | 0 248 617 A2 | 12/1987 |
| EP | 1 117 281 A1 | 7/2001 |
| EP | 1 918 339 A1 | 5/2008 |
| GB | 2 109 166 A | 5/1983 |
| JP | 60-107391 A | 6/1985 |
| JP | 2-50831 A | 2/1990 |
| JP | 2-50833 A | 2/1990 |
| JP | 3-277677 A | 12/1991 |
| JP | 9-203445 A | 8/1997 |
| JP | 10-88094 A | 4/1998 |
| WO | 03/026371 A1 | 3/2003 |
| WO | 2008/076473 A2 | 6/2008 |

* cited by examiner

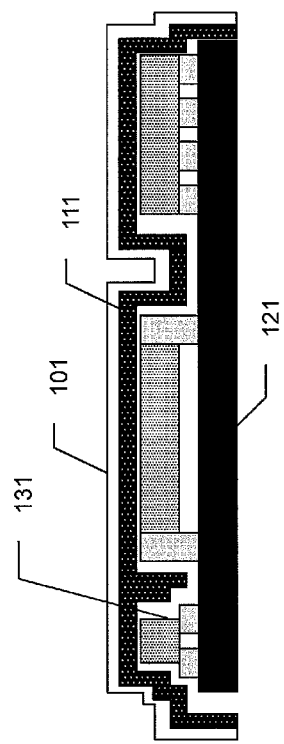

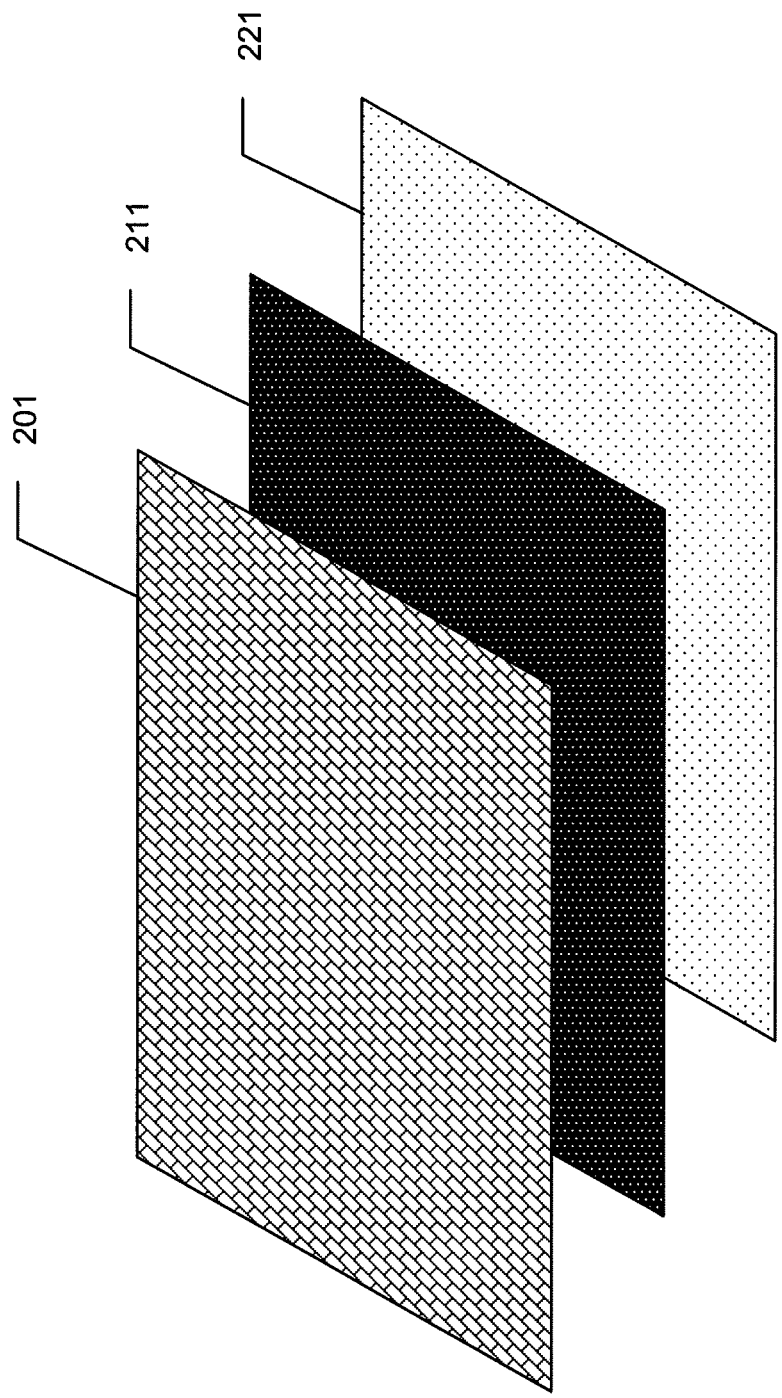

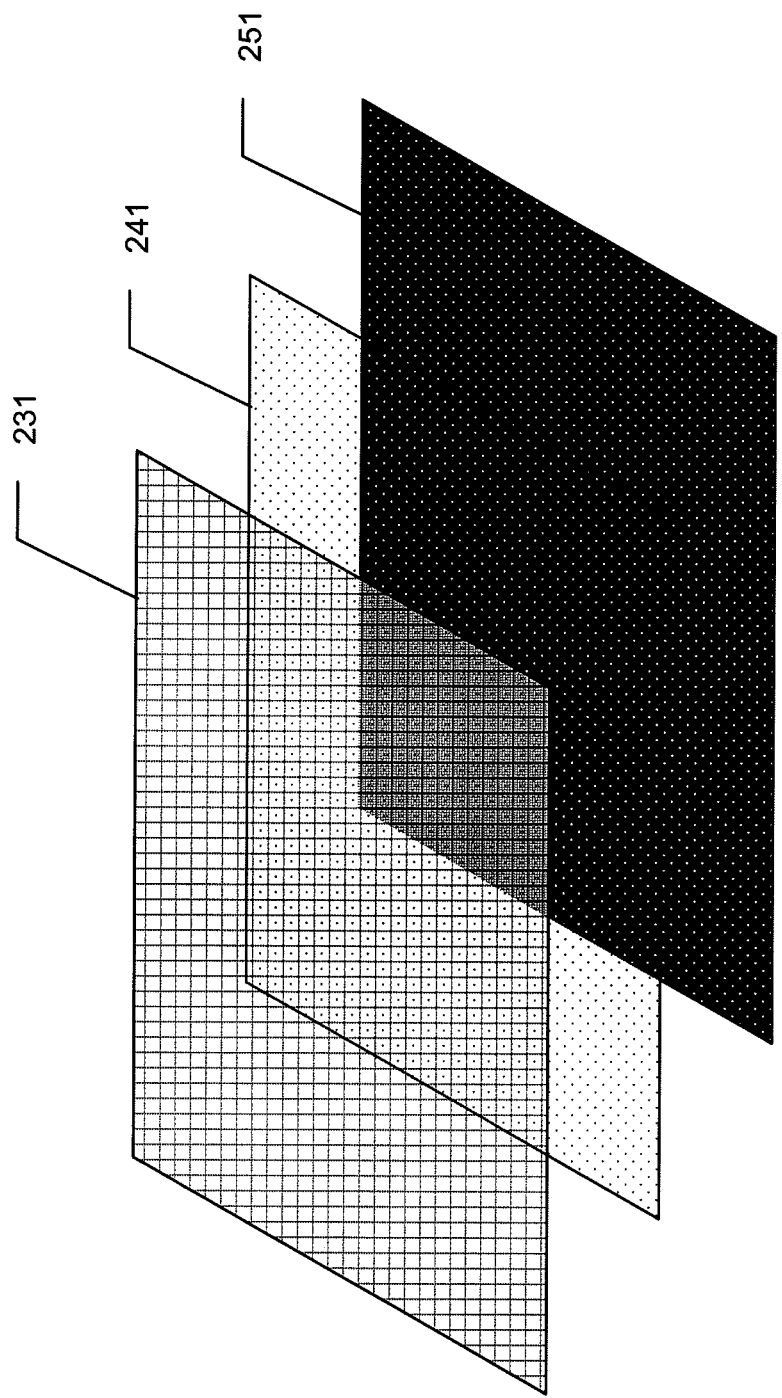

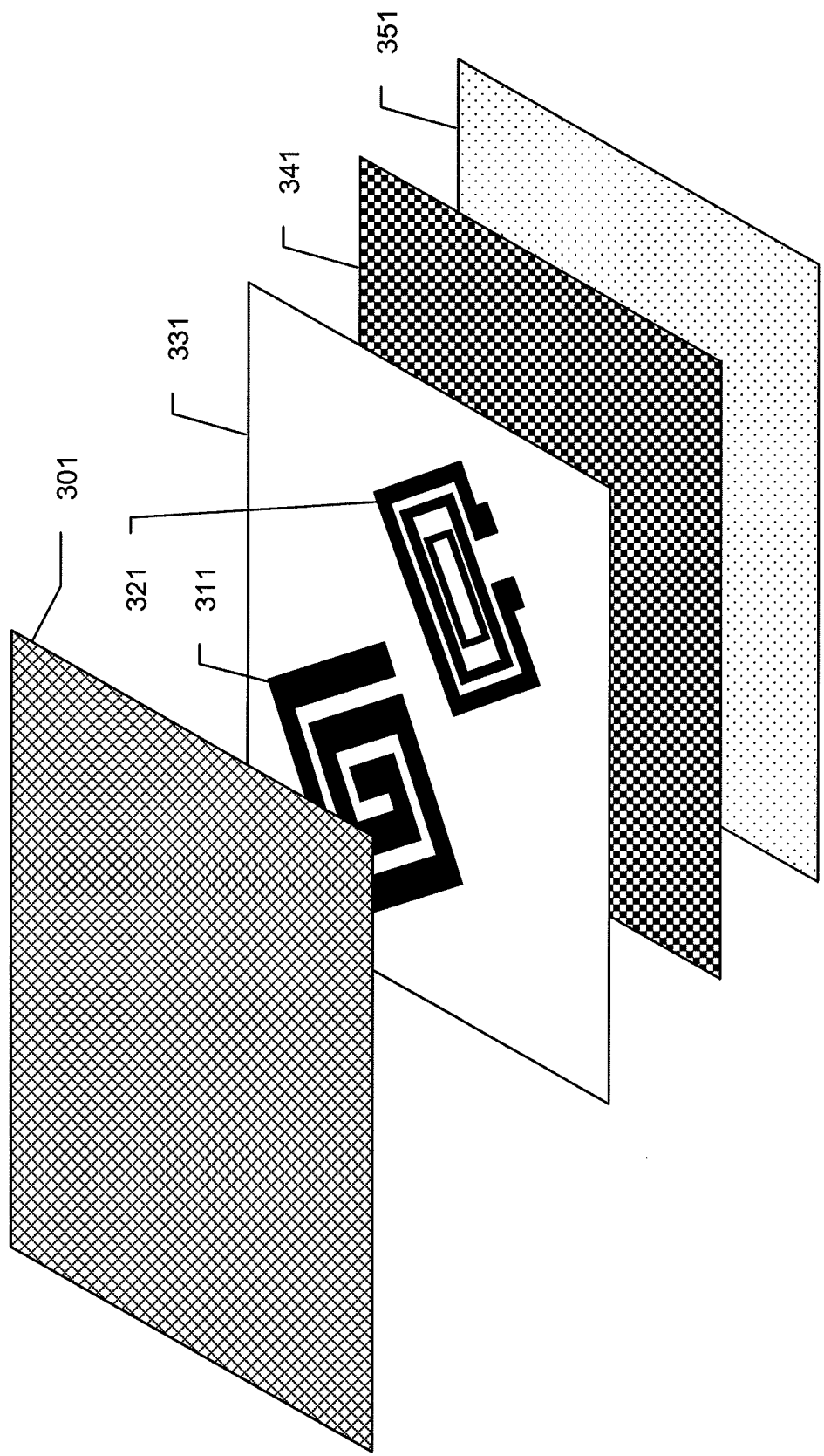

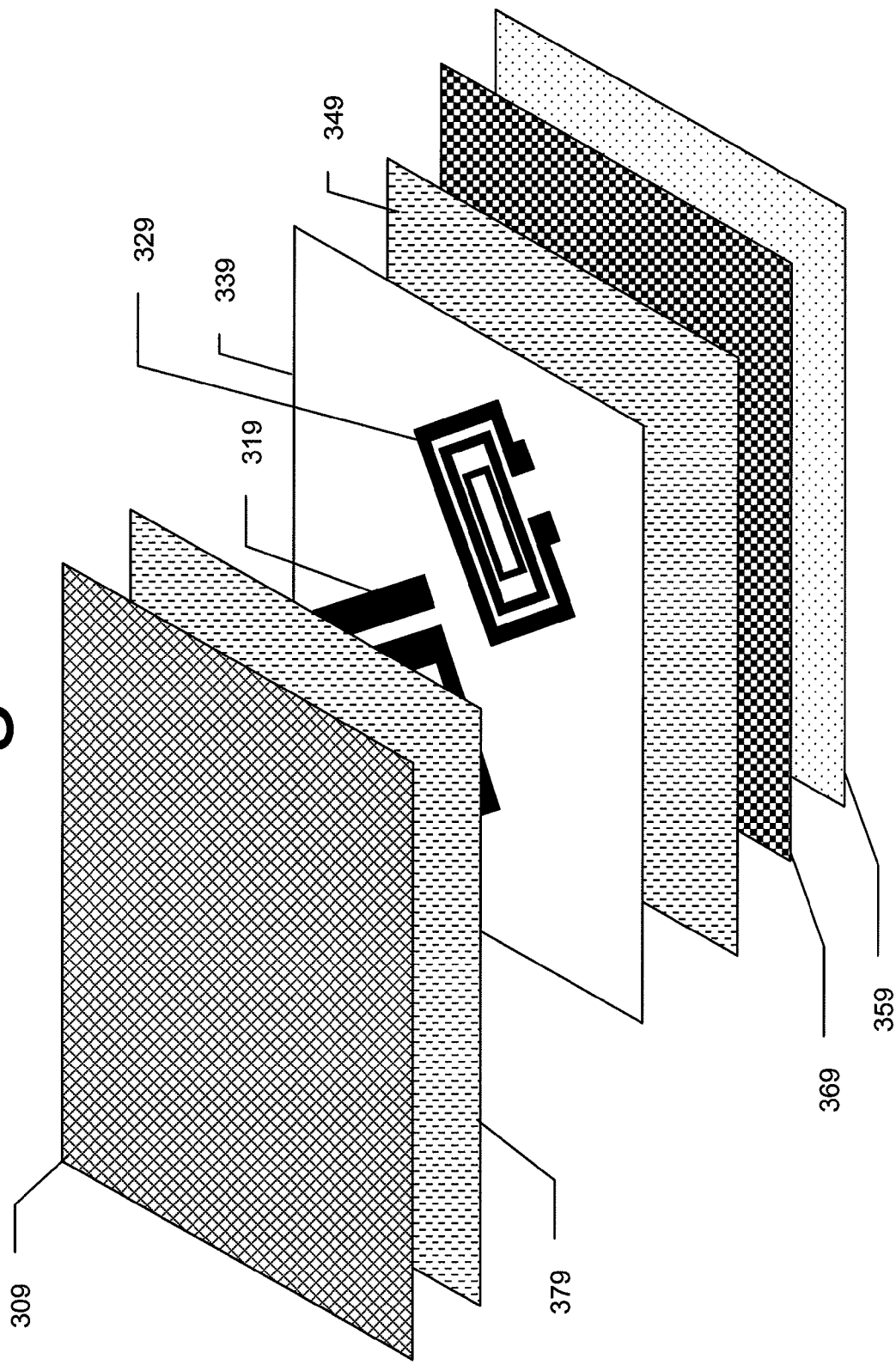

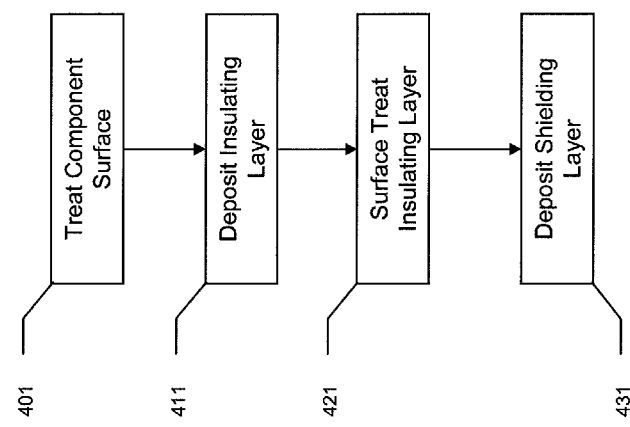

SERVICEABLE CONFORMAL EM SHIELD

The present invention claims benefit of priority to Provisional Application 61/251,565, filed in the U.S. Patent and Trademark Office on Oct. 14, 2009, the entire contents of which are hereby incorporated by reference. The present invention also claims benefit of priority to Provisional Application 61/348,156, filed in the U.S. Patent and Trademark Office on May 25, 2010, the entire contents of which are hereby incorporated by reference.

FIELD OF THE INVENTION

The present invention relates generally to electromagnetic and radio-frequency shielding solutions to protect components or information stored in electronic or optical modules, components of a printed circuit or wiring board, or in integrated circuits or optical devices.

BACKGROUND OF THE INVENTION

Electromagnetic (EM) interference can cause detrimental effects on electronic systems. These effects may range from unwanted noise to critical system failures or information loss. In order to avoid these problems, it is necessary to shield electronic systems and components from EM radiation.

EM shielding is normally accomplished through the use of metallic or metallized enclosures surrounding sensitive components. Such shielding solutions tend to be heavy and bulky. They also usually require ports or other access points through the enclosure to connect components in the enclosure to non-shielded components or require openings to allow for sufficient cooling of components underneath the shielding. This may allow for leakage of EM radiation into or out of the enclosure. EM shielding can also be used to prevent the radiation of noisy components from affecting nearby susceptible components.

Alternate solutions for EM shielding include the direct application of films or coatings onto sensitive components. These films or coatings are non-removable and effectively prevent the coated components from being serviced or repaired. System boards so coated must be wholly replaced because the EM shielding film cannot be removed to allow for component maintenance/service, or the adhesive films must be removed using chemicals or additional cleaning techniques to remove remnant adhesives or residues.

It would be an advance in the art to create a conformal EM shield coating that can be easily removed to allow for maintenance of the underlying components.

SUMMARY OF THE INVENTION

Aspects of the present invention are directed at solving the problems associated with non-removable EM shielding films. Certain aspects relate to the removal and re-application of EM shielding coatings to components. Although the variations discussed herein refer to shielded electronic components, the shielded components in other variations may be electronic components, optical components, or mechanical components.

Some aspects of the present invention are related to EM shielding coatings having one or more layers. In one variation an electrically insulating layer may be deposited over the component(s) to be protected.

Variations of a deposition process for an insulating layer may include spraying, dispensing, powder-coating, laminating, painting, vapor deposition, flame spray, or submerging the component(s) in a desired electrically insulating material such as elastomer, silicone, latex, ceramic, glass, or other suitable passivating material which may allow for easy removal of the coating. Variations of a passivation layer may include directly written silicone or sprayed-on urethane. Further variations of a passivation layer may include acrylic, parylene, kraton, noryl, etc. In some cases, a urethane layer may provide improved adhesion between the passivating layer and its substrate.

For variations using a pliable material such as silicone, elastomer, resin, latex, rubber, or plastic, a variation of a deposition process may include applying a viscous or partially liquid form of a suitable material that may then subsequently cure or dry into a solid, flexible coating. Other variations may include applying high-dielectric, semi-solid gels that remain viscous or are otherwise non-curing. Yet other variations may include applying a granular or powder-based, solid coating that may then be treated with heat and/or solvents to form a continuous insulating layer. Further variations still may include using an epoxy or coating or adhesive whose adhesion and/or flexibility properties may be altered by applying a current or voltage to it.

Variations having an insulating or passivating layer may then be further processed such that an electrically conductive layer or coating is applied onto the insulating or passivating layer. Variations of an electrically conductive layer may include a wire mesh, plated conduction paths (created, in some variations, with an electrolytic or electroless plating process), printed electrically-conductive inks, dispensed metallic or metal-bearing substances, including those printable metal-bearing materials that require subsequent sintering via oven or laser; and/or another layer of electrical components. Variations of an electrically conductive layer may be connected to grounded access points or backshells of connectors or similar connection points on the protected electrical component(s). In some variations where a permanent or otherwise not readily removable passivation layer has already been applied, only a removable/strippable elastomeric layer may be required. Variations of such a strippable elastomer could be peeled away from the substrate to enable servicing and/or maintenance. Examples of a non-removable passivation layer suitable for such a variation may include urethane, parylene, and acrylic.

Further variations may include subsequent layers of electrically insulating and electrically conductive materials. Such variations may be useful for multi-layered component assemblies where one or more of the electrically conductive layers include electrical components that either do not require or are otherwise configured to function without EM shielding.

In further variations, indicator materials, such as dyes or inks or other electromagnetically responsive substances could be included in one or more layers of a variation of an EM shield. Such indicator materials may show changes in color or texture, or provide some other signature indicating a particular level or intensity of EM exposure or indicate voltages and/or electric field strengths greater than threshold levels.

Yet further variations may include additional layers either between the insulating layer and an electrically conductive layer or on top of an electrically conductive layer. Variations of such layers may act as additional insulating layer(s). Such layers may provide mechanical support/rigidity, corrosion resistance, additional electrical functionality, tamper prevention, CTE mismatch compensation, RF-shielding, heat management, waterproofing, noise generation, noise reduction, or a wide range of other possible functions/features. In one variation, a silicone electrically insulating layer may provide electrical insulation and waterproofing and corrosion resistance. In other variations materials such as urethane, polystyrene, santoprene, and EPDM rubber may be employed.

Variations of a deposition process may include depositing multiple layers simultaneously. Such a variation may include printer-style deposition of a viscous silicone with a conductive core or a ribbon of ductile material simultaneously deposited on top of said silicone. Some variations of a deposition process may be tailored to deposit one or more coatings that are intended to be removable for the purpose of gaining access to a base or underlying layer for servicing, inspection, modification, etc.

One variation of a method of applying a conformal electromagnetic (EM) shield to a component may include the steps of: depositing an insulating layer onto at least part of the component; and depositing an electrically conductive layer onto the insulating layer. In such a variation the insulating layer may be deposited such that it can be readily stripped from the component and the electrically conductive layer is deposited such that it cannot be readily removed from the insulating layer. In further variations, the step of depositing an insulating layer may include using a direct-write, screen printing, spraying, or painting deposition technique. In yet further variations, the method may include steps such as: depositing a ground plane between an insulating layer and an electrically conductive layer; connecting an electrically conductive layer to grounded access points or backshells of a component; and depositing a capping layer on top of the electrically conductive layer. In such variations, an electrically conductive layer may include at least one of a circuit, an antenna, a conduction path, a wire mesh, a microprocessor, an EM-responsive ink or dye, a passive electronic component, and an active electronic component.

Advantages of variations of EM shielding coatings as discussed above may include reduction of weight, bulk, space or volume requirements, and cost for shielded components. This reduces the overall size of the component and is pertinent to any weight or size sensitive application, such as aviation-related and space-related applications, as well as the continual miniaturization of consumer electronics devices. Further advantages may include reduced EM leakage in variations having shielding on all of a component except for actual connection points or having EM shielding arranged such that it blocks transmission paths.

Yet further variations may allow for reduced or minimal wire or on-board component torsion during use and/or during EM shield application or removal through the use of flexible or pliable shield layer materials. This reduces potential points of failure by making the maintenance and service processes less error-prone and also by removing the potential for a shielded component to contact a rigid material that may cause unwanted flexion or deformation in the component, thereby potentially altering signal pathway characteristics. Such variations may have special benefit for components or component assemblies with complex cabling or that have flexibility requirements (such as flexible circuit boards, flexible laminate cables, or wiring ribbons). Additionally, with the advent of flexible electronics, such as flexible displays and wearable electronics, rigid shields interfere mechanically with the intended nature of the products, and pliant shielding offers a solution to the aforementioned problem.

Further variations may allow for servicing or re-work of shielded components by having a removable, pliable shield. Such a shield may have a base layer of an elastomeric, silicon-based, or other pliable material that may allow the EM shield to be peeled up and away from the substrate and shielded component(s). In some variations, a shielding having a base or insulating layer with the proper adhesive properties may be re-applied after removal instead or requiring the deposition of a new flexible EM shield. Such variations may allow for field-level service and maintenance without compromising or otherwise negatively affecting the EM shield of a component or component assembly.

Further variation still may allow for interchangeable EM shields having different active or passive components therein. Such shields may allow the use of common components and modular electronic assemblies with customized behaviors being configured and governed by electrical component assemblies embedded within, printed on, or etched into an EM shield according to the present invention. In some variations, one or more layers of an EM shield may include printed antennas, electrical feedthroughs to external devices or systems, or impedance matching networks (single or double stubs or shunt stubs, etc.).

One variation pertains to conformal electromagnetic (EM) shield used for shielding a component. Such a variation may include a conformal electrically insulating layer disposed over at least part of the component and a conformal electrically conductive layer disposed over the electrically insulating layer. In such a variation, the insulating layer may be configured as a strippable layer that peels away from the component and the electrically conductive layer may be configured to remain attached to the electrically insulating layer. In some variations, the shielded component may be an electronic component. In other variations, the shielded component may be an electro-optical, optical, radio-frequency, or magnetic component.

Further variations may include a second conductive layer disposed on top of the electrically conductive layer. Yet further variations may include an intervening dielectric layer disposed between the electrically conductive layer and a conductive layer. In further variations still, an electrically conductive layer may include at least one of a wire mesh, plated conduction paths, printed conduction paths, and electronic components. In yet further variations, an electrically conductive layer may be connected to grounded access points or backshells of connectors on a coated component.

Some variations of a conductive layer may include electronic components that detect the presence and intensity of electromagnetic interference. In some variations, such electronic components may generate a control signal when the detected electromagnetic interference exceeds a certain threshold. In further variations, the control signal alters or de-activates the operation of one or more portions of said component.

In some variations, the intervening layer may compensate for shear stresses caused by CTE mismatch. In other variations, the shield may include a capping layer disposed on top of an electrically conductive layer, where the capping layer provides at least one of mechanical rigidity, corrosion resistance, waterproofing, and temperature control. In some variations, the capping layer may be EPDM rubber. In other variations, the insulating layer may be an elastomeric layer. In yet further variations, the electrically conductive layer may be a ground plane.

In some variations, a second conductive layer may include at least one of two or more printed antennas and an impedance matching network. In other variations, the coated component may include un-shielded interface points. In yet further variations, the electrically conductive layer may include one or more electro-magnetically (EM) responsive inks or dyes, where said ink or dye changes its spectral response after exposure at or above a threshold EM radiation level.

In further variations, a shield may include a capping layer disposed on top of said second conductive layer. In some variations, such a capping layer may include parylene.

Further scope of applicability of the present invention will become apparent from the detailed description given hereinafter. However, it should be understood that the detailed description and specific examples, while indicating preferred variations of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given herein below and the accompanying drawings which are given by way of illustration only, and thus are not limitative of the present invention, and wherein FIG. 1a is a block diagram of a component covered with a variation of a conformal EM shield;

FIG. 2a is a diagram showing a layer structure in a variation of a conformal EM shield;

FIG. 2b is a diagram showing a layer structure in a variation of a conformal EM shield;

FIG. 3a is a diagram showing a layer structure in a variation of a conformal EM shield;

FIG. 3b is a diagram showing a layer structure in a variation of a conformal EM shield;

FIG. 4a is a block diagram of a variation of a process for creating a variation of a conformal EM shield.

Figure 1B:
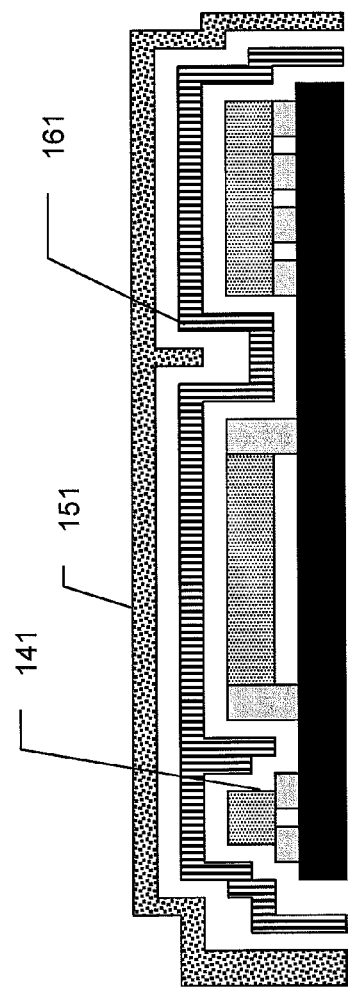
FIG. 1b is a block diagram of a component covered with a variation of a conformal EM shield.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

In one variation, as shown in FIG. 1a, a conformal electromagnetic shield for an electronic or electro-optical component or component group may include at least an electrically insulating layer 111 disposed onto the component 131 surface and an electrically conductive shielding layer 101 disposed on top of the insulating layer.

Some such variations may include an elastomeric insulating layer 111 such as silicone, elastomer, resin, latex, rubber, and similar flexible substances. Such variations of an insulating layer 111 may be configured, based on the material properties of the layer and the underlying component(s) 131, to be easily removable such that the underlying components may be accessed for maintenance, repair, or re-configuration.

Variations of an electrically conductive shielding layer 101 may include fully metalized layers/regions such as ground planes, wire mesh or grid, one or more antenna arrays, frequency-specific external RF-absorbing layers, impedance matching networks, printed or plated conduction pathways, embedded circuit components, and connections to ground or backshell points on the underlying component(s) or other nearby ground sources.

Variations of a conductive layer 101 may be disposed onto the insulating layer 111 such that the conductive layer 101 strongly adheres to, or even bonds with, the insulating layer 111. In some variations, both the conductive and insulating layer may remain flexible such that the adhered/bonded combination layer may be easily peeled back or stripped from the underlying component(s) 131 in order to allow access to the component(s) for maintenance, repair, or reconfiguration.

In the variation shown in FIG. 1a, a circuit board 121 having electronic components 131 mounted thereon is covered with an elastomeric insulating layer 111 that does not adhere strongly to the board or components. The elastomeric layer is conformal so that it minimally alters the shape and footprint of the board (if at all). In some variations, the board and components may be subject to surface treatment before the elastomeric layer 111 is applied. Such surface treatment may reduce the amount or level of adhesion between the board and the elastomeric layer, making it easier to strip or remove at a later time. Variations of surface treatments may include dips, sprays, plasma treatments, etching, ashing, and other known surface modification techniques.

In other variations, such as the variation shown in FIG. 1b, an electrically insulating layer 161 may be deposited as a permanent coating onto a substrate component 141 or component assembly. Such variations may be useful in situations where the components 141 are not meant to be modified or should otherwise be sealed/coated to prevent or restrict access thereto. In some non-strippable insulating layer 151 variations, an electrically conductive layer 151 may be applied such that it adheres strongly to the insulating layer, creating a conformal, non-strippable electromagnetic shield coating. Such a variation may be useful for size or weight-limited components where modification or maintenance are not important. In further non-strippable insulating layer variations, an electrically conductive layer 151 may be applied such that it is strippable from the insulating layer 161.

A variation of a multi-layer conformal EM shield is depicted in FIG. 2a. In the variation shown, an insulating layer 221 may be disposed on a substrate (not shown) as either a strippable or non-strippable layer. An electrically conductive EM shielding layer 211 may then be deposited onto the insulating layer in order to provide EM shielding. In some variations, a capping or covering layer 201 may then be deposited onto the conductive layer to provide some measure of protection from environmental factors or wear/use damage.

Variations of a capping layer may include urethane, polystyrene, rubber, EPDM rubber, vinyl, lacquer, resin, or other materials suitable for protecting a component from excessive wear, environmental damage (moisture, chemicals), or jarring impacts. In an alternate variation, the electrically conductive shielding layer could be the capping layer 201, with an intervening layer 211 disposed between the shielding layer 201 and the insulating layer 221 to provide CTE compensation, shock absorption, waterproofing, heat containment or heat dissipation, or additional conductive portions.

Variations of an EM shielding layer 211 may include broad-spectrum or tailored EM shields and shielding materials. In one variation, a metallic foil may be deposited over a strippable elastomeric layer in order to provide light-weight, low-cost, broad-spectrum EM shielding. In other variations, specific material compositions and shapes may be introduced into the EM shielding layer such that it can be tailored to provide added protection against particular EM frequencies and/or allow passage of specific frequency ranges. An EM shielding layer made of a wire mesh or an electrically conductive, transparent material, such as indium tin oxide (ITO), and disposed over a clear or IR-transparent elastomer, for instance, may provide EM shielding while still permitting visual or IR-based electro-optical inspection of the components without necessitating shield removal. Such a variation, depicted in FIG. 2b, may include a substrate layer 251 representing a component or component portion covered by the EM shield. The elastomeric insulating layer 241 may be a fully or partially electro-optically transparent coating including silicone, elastomer, acrylic, latex, kraton, parylene, or other suitable materials that are flexible and deposited in a manner such that they are easily strippable from the underlying component. The EM shielding layer 231 may be a wire mesh, patterned foil, deposited or printed or plated conduction paths, or similar structure applied to the insulating layer 251 such that the EM shield adheres to the insulating layer. The EM shielding layer 231 in such a variation is patterned to enable visual or camera-based electro-optical inspection of the shielded component 251 while providing EM shielding across a broad or specifically tailored spectrum. The EM shield 231 may be made of one or more metals or alloys, such as copper, gold, aluminum, nickel, molybdenum, iron or combinations thereof. Variations of an EM shield may also include metal foam, mu-metal, or other magnetically permeable metals that provide improved EM protection.

Variations of an EM shielding layer may be configured to serve as high-pass, low-pass, or band-pass EM filters such that a component may be shielded from those frequencies known or expected to be harmful or otherwise undesirable while permitting transmission and/or reception of certain radio-frequency signals. Such a variation may be useful for shielding communication or signaling devise or certain portions of remotely-operated or remotely-monitored devices. Further variations of an EM shielding layer may be configured to perform more complicated protection and filtering functions, such as those of an impedance-matching network or a resonant antenna array. In some variations, reflectionless impedance matching may be desirable to both shield a component and conceal it from EM-based detection schemes. In other variations, resonant antenna networks may be desirable to focus and reflect intense EM radiation at specific frequencies to overload or otherwise drown-out any meaningful detection signal that could otherwise be gathered through an EM-based detection scheme. In yet further variations, combinations of impedance-matching, antenna networks and/or active and passive circuit components in an EM shielding layer may be used to create "spoofed" signals or signal responses such that a shielded component resembles some other component or component type when analyzed with an EM-based detection scheme.

A variation of a conformal EM shield having a layer that includes conductive components such as antennas or impedance-matching networks or radiation-detecting components is depicted in FIG. 3a.

In the variation shown, a substrate (not shown) may have an insulating layer 351 disposed thereon. A layer containing electromagnetically (EM) responsive/active components 331 such as one or more antennas 321, inductors 311, or impedance-matching networks (not shown) may be disposed to function as, or in addition to, a conductive shielding layer. In some variations, an intervening ground plane 341 may be disposed between the insulating layer 351 and the EM-active layer 331 to protect components on the substrate from any interference or radiation generated or used by the components in the EM-active layer 331. In other variations, the intervening layer 341 may have some other purpose instead or, or in addition to, acting as a ground plane. It may provide CTE matching, shock absorption, environmental protection (waterproofing /chemical resistance/etc.), or heat regulation. In yet further variations, the intervening layer may be omitted entirely or otherwise have its functions integrated into the insulating layer 351.

Variations of components in the EM-active layer may include antennas, inductors, capacitors, resistors, transistors, transistor arrays, operational amplifiers, semiconductor devices, switches, switch arrays, multi-layered component assemblies, resonators, and impedance matching devices. Discrete components such as small microprocessors may also be placed and electrically connected into the coating system. Variations of such components may include elements such as inductors or capacitors that may signal the presence and/or intensity of EM interference to the protected component(s) underneath the coating. Additional coating-level computation could occur by placing and connecting the components that make up a circuit capable of decision-making. Such variations may allow for shielded components that may wholly or partially de-activate when detected EM radiation approaches shield threshold levels or otherwise indicates an undesirable operating environment. In further variations, excess EM could evoke a recording cycle or otherwise indicate a response where the event is recorded or otherwise logged. Variations of such features or functions may be realized through the embedding of sensors (e.g. a printed antenna or inductor or similar component that is responsive to an electromagnetic field) on or within an EM-active portion 331 of the conformal shield coating to monitor the level of EM radiation. In some variations, the outputs of such embedded sensors can be used to send a shutdown signal to various components in the event that the EM field exceeds the specified threshold.

Variations of an EM-active layer 331 may be capped or otherwise covered by a capping layer 301 which may be an environmentally protective layer, a ground plane layer, or a combination thereof.

FIG. 3b shows a variation of a conformal EM shield having an EM-active layer and at least one ground plane layer. In the variation depicted, the conformal EM shield has an insulating layer 359 that may or may not be strippable depending on the maintenance and repair requirements of the underlying component. Preferably, the insulating layer is silicone or an elastomeric substance that does not strongly adhere to the underlying component(s) but does adhere strongly to an intervening layer 369 that may be included for CTE compensation, shock absorption, waterproofing, heat containment or heat dissipation, or additional conductive portions. An intervening layer 369, if included, may be an elastomeric, foam-like, waterproof, or otherwise flexible and/or impermeable layer. In some variations, however, the intervening layer may be omitted. In yet other variations, the intervening layer may be configured for certain thermal conductivity properties such as heat dissipation or heat retention.

The EM-active layer 339, which contains electromagnetically responsive components 319, 329, may be disposed on top of either the insulating layer 359 or the intervening layer. Preferably, a ground plane layer 349 will separate the EM-active layer 339 from the underlying layers. Such a ground plane layer may include a gridded or continuous metallization layer, a wire mesh, a network of conduction paths, or other suitable electrically conductive materials.

The EM-active layer 339 may include components such as antennas 329, inductors 319, capacitors, resistors, multi-layered component assemblies, resonators, ring oscillators, and impedance matching devices. Variations of such components may include elements such as inductors or capacitors that may signal the presence and/or intensity of EM interference to the protected component(s) underneath the coating. Such variations may allow for shielded components that may wholly or partially de-activate when detected EM radiation approaches shield threshold levels or otherwise indicates an undesirable operating environment. In some variations, such components may include active or passive circuit elements (capacitors, inductors, transistors, operational amplifiers, antennas, switches, component arrays) and/or discrete components such as microprocessors. In further variations, coating-level computation could occur along with coating-level EM detection by placing and connecting components into decision-capable circuits. In yet further variations, excess EM could evoke a recording cycle or otherwise indicate a response where the event is recorded or otherwise logged. Variations of such features or functions may be realized through the embedding of sensors (e.g. a printed antenna or inductor or similar component that is responsive to an electromagnetic field) on or within an EM-active portion 331 of the conformal shield coating to monitor the level of EM radiation. In some variations, the outputs of such embedded sensors can be used to send a shutdown signal to various components in the event that the EM field exceeds the specified threshold. In other variations, an EM-active layer may include an electromagnetically responsive ink or dye that provides a visual indication of EM radiation exposure either above a certain threshold or otherwise indicates the extent /intensity of exposure based on changes in the ink or dye.

The EM-active layer may be covered by another ground plane layer 379 or an EM-shielding layer 379 that also acts as a ground plane. Such a ground plane shielding layer 379 may include a metallization coating, wire mesh, networks of conduction paths, or other suitable materials to provide at least one of ground plane or electromagnetic shielding function. Preferably, the EM-shielding layer 379 is a flexible or readily deformable metallization layer deposited over or in conjunction with a flexible dielectric such that it is electrically isolated from the EM-active layer 339 and provides EM shielding capability while not impairing the ability of a technician or machine to easily strip the entire coating from the component.

Such a variation of a conformal EM-shield coating may also include a capping or top layer 309 that provides some measure of environmental protection and/or wear protection. Such a layer may be silicone, EPDM rubber, polystyrene, resin, or a heavier metallization coating or some combination thereof. In some embodiments, the EM-shielding layer 379 metallization coating may be sufficient to act as a protective cover as well, eliminating the need for a capping layer 309.

Another aspect of the present invention relates to methods for creating and applying a conformal EM shield coating to a component or substrate. One variation of an application method is depicted in FIG. 4a.

In the process depicted, a component may have its surface treated 401 prior to depositing the insulating layer in order to decrease or otherwise modify component surface adhesion. When the insulating layer is deposited 411 on the potentially treated surface, it may not adhere strongly to the component—making the insulating layer and all layers applied thereon strippable or otherwise readily removable.

In a variation of the process, a surface treatment operation to increase the surface adhesion 401 of the component or substrate may be performed, making the subsequently applied 411 insulating layer non-strippable or otherwise strongly attached to the component. In yet further variations, surface treatment prior to deposition of an insulating layer may be omitted entirely.

After the insulating layer is applied, it may be subjected to surface treatment 421 in order to increase or otherwise modify its surface adhesion before an intervening, ground, EM-active, or shielding layer is applied 431. In a variation of the process, surface treatment may be performed 421 on the insulating layer to decrease or otherwise modify its surface adhesion, making subsequent EM shield coating layers strippable separately from the insulating layer. In yet further variations, the surface processing step may be omitted entirely and/or an epoxy or other chemical binding approach may be used to promote adhesion between the insulating layer and subsequent layer(s).

Figure 4B:
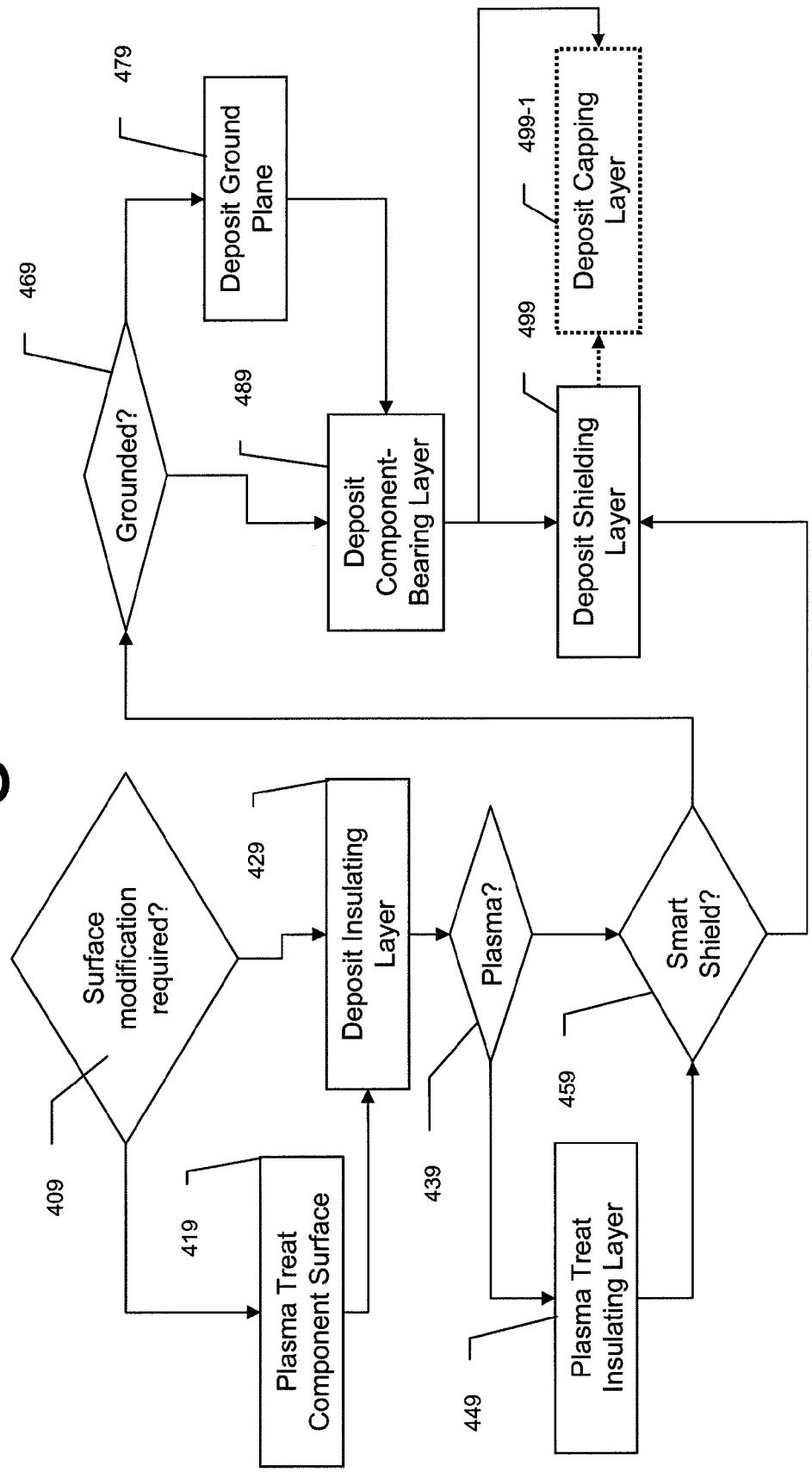
FIG. 4b is a block diagram of a variation of a process for creating a variation of a conformal EM shield.

In the variation shown, a simple, two-layer conformal EM shield coating is created. An insulating layer is applied and an EM-shielding layer is applied on top of the insulating layer. In further variations, a multi-layered conformal coating may be so constructed by sequentially depositing desired layers and layer types until the coating is completed according to design or user requirements. An example of a coating creation process for creating different coating types or configurations is depicted in FIG. 4b.

For production variations where surface treatment may be optional, coating production/deposition may begin a determination step 409 of whether or not to treat a surface. Either after surface treatment 419 or without prior surface treatment, an insulating layer may be deposited 429 into a component or substrate. The surface treatment process 419 may include one or more plasma treatment techniques, such as corona treatment, flame plasma, atmospheric plasma, gas plasma, vacuum plasma, glow-discharge plasma and plasma etching techniques. Variations of the deposition process 429 may include one or more of direct-write deposition, painting, spraying, dipping, physical vapor deposition, chemical vapor deposition, sputtering, screen printing, MBE, plasma-assisted deposition, and plating.

After an insulating layer is deposited, it may be subjected to surface treatment to alter its surface characteristics in order to promote or reduce adhesion between the insulating layer and a subsequent layer. In a process where such surface treatment is optional or otherwise configurably or selectively activated, a determination is first required 439 to decide whether to perform surface treatment 449 on the insulating layer or not. After surface treatment 449 or, in non-treated variants, instead of surface treatment, an application process for creating a potentially EM-active conformal shield may commence.

If it is determined or the production process is configured 459 to create a 'smart shield' having an EM-active layer, it must be further determined or established whether or not the EM-active layer will have an underlying ground plane 469. In a variation without a ground plane, a component-bearing or EM-active layer is deposited 489 directly onto the insulating layer or into an intervening layer other than a ground layer (not shown). Otherwise, a ground plane is deposited 479 to protect the underlying component from potential interference due to the components in the subsequently-deposited EM-active layer 489.

After depositing the EM-active layer 489 or, in non 'smart-shield' variations, instead of depositing an EM-active layer, a shielding layer may be deposited 499. The shielding layer may act as an upper ground plane for the EM-active layer. In variations having a lower ground plane layer, the lower ground plane layer 479 may act as an EM shielding layer, removing the need to deposit a shielding layer 499 on top of the EM active layer.

In yet further variations, a capping layer may be deposited 499-1 onto a shielding layer or a component-bearing layer. A capping layer may be deposited to provide environmental or wear/impact protection to the component-bearing layer and/or to any layers underneath the capping layer.

Variations of a conformal EM shield coating and/or an associated coating production/deposition process according to the present invention may be used anywhere that conventional shielding is used. One variation of such a coating could be used in the communications industry to provide lightweight, non-bulky shielding to cellphones and smartphones/PDAs, walkie-talkies or other handheld communications devices, GPS locators and guidance devices, and other radio frequency (RF) devices.

Cellphones and other radio frequency (RF) devices traditionally use metal "cans" to enclose components susceptible to EMI or other RF noise. A selectively depositable EMI shielding could provide a low-cost alternative. Strippable and non-strippable coating embodiments may be suitable depending on the expected lifetime of a coated component and its anticipated maintenance/upgrade needs.

Another area of application for variations of the conformal EM shield coating may be where hot components are conventionally shielded using metal cans. These metal cans are folded metal boxes that solder around noisy and/or noise-susceptible components. In the case where heat is an issue, holes in the can provide means for heat to escape by convective cooling. Consequently, the holes allow for high-frequency signals to pass through the shielding, as well. A continuous, conductive coating would prevent this, and by combining the conductive component with an elastomeric passivation layer, the coating becomes removable. Variations of such a coating can be formulated to also allow for heat to escape from the assembly by using thermally conductive or otherwise non-thermally insulating but electrically insulating coating materials and/or by creating thermal vias in the coating to facilitate heat dissipation.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A conformal electromagnetic (EM) shield used for shielding a component, the shield comprising:
    a conformal electrically insulating layer disposed over at least part of the component;
    a first conformal electrically conductive layer disposed over said electrically insulating layer; and
    a second conformal electrically conductive layer disposed on top of the first conformal electrically conductive layer;
    wherein said insulating layer is configured as a strippable layer having a level of adhesion to the component such that the insulating layer peels away from the component and
    wherein said electrically conductive layer is configured to remain attached to the electrically insulating layer.

2. The shield of claim 1, where said component is an electronic component.

3. The shield of claim 1, said shield including an intervening dielectric layer disposed between said first conformal electrically conductive layer and said second second conformal electrically conductive layer.

4. The shield of claim 1, said first conformal electrically conductive layer including at least one of a wire mesh, plated conduction paths, printed conduction paths, and electronic components.

5. The shield of claim 1, where said first conformal electrically conductive layer is connected to grounded access points or backshells of connectors on said component.

6. The shield of claim 3, where the intervening dielectric layer compensates for shear stresses caused by CTE mismatch.

7. The shield of claim 1, said shield including a capping layer disposed on top of said second conformal electrically conductive layer, where the capping layer provides at least one of mechanical rigidity, corrosion resistance, waterproofing, and temperature control.

8. The shield of claim 7, where said capping layer is EPDM rubber.

9. The shield of claim 7 said capping layer including parylene.

10. The shield of claim 1, where said electrically insulating layer is an elastomeric layer.

11. The shield of claim 1, where said first conformal electrically conductive layer is a ground plane.

12. The shield of claim 1, where said second conformal electrically conductive layer includes at least one of: two or more printed antennas; and an impedance matching network.

13. The shield of claim 1, where the level of adhesion between the insulating layer and the component is determined based on surface treatment of the component, said surface treatment being carried out before the insulating layer is disposed over said component.

14. A conformal electromagnetic (EM) shield used for shielding a component, the shield comprising:
    a conformal electrically insulating layer disposed over at least part of the component;
    a conformal electrically conductive layer disposed over said electrically insulating layer, and
    wherein said insulating layer is configured as a strippable layer that peels away from the component;
    wherein said electrically conductive layer is configured to remain attached to the electrically insulating layer; and
    where said electrically conductive layer includes electronic components that detect a presence and intensity of electromagnetic interference.

15. The shield of claim 14, where said electronic components generate a control signal when a detected electromagnetic interference exceeds a certain threshold.

16. The shield of claim 15, where the control signal alters or de-activates operation of one or more portions of said component.

17. A conformal electromagnetic (EM) shield used for shielding a component, the shield comprising:
    a conformal electrically insulating layer disposed over at least part of the component;
    a conformal electrically conductive layer disposed over said electrically insulating layer; and
    wherein said insulating layer is configured as a strippable layer that peels away from the component;
    wherein said electrically conductive layer is configured to remain attached to the electrically insulating layer, and
    where the electrically conductive layer includes one or more EM responsive inks or dyes, where at least one of said one or more EM responsive inks or dyes changes a spectral response after exposure at or above a threshold EM radiation level.

* * * * *